March 31, 1925.  
C. A. HITE  
1,531,338

DEVICE FOR TAKING UP WARP IN WHEELS

Filed July 5, 1922  2 Sheets-Sheet 1

Inventor  
Chester A. Hite

By  
Attorney

March 31, 1925.
1,531,338
C. A. HITE
DEVICE FOR TAKING UP WARP IN WHEELS
Filed July 5, 1922     2 Sheets-Sheet 2
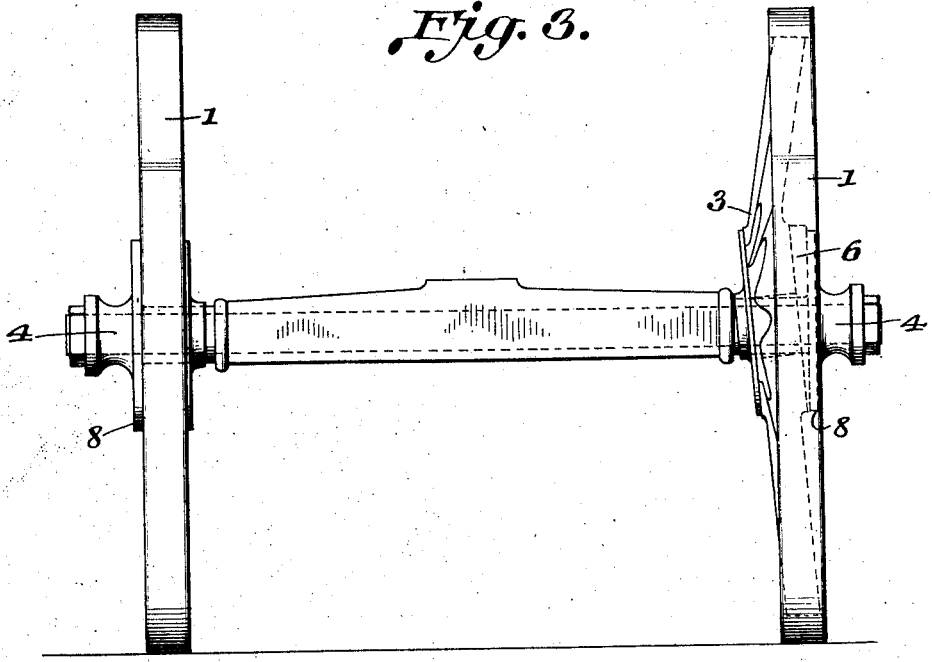
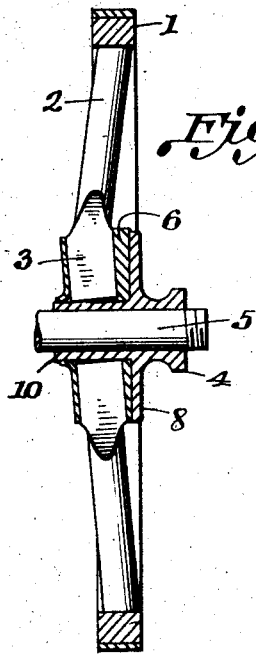 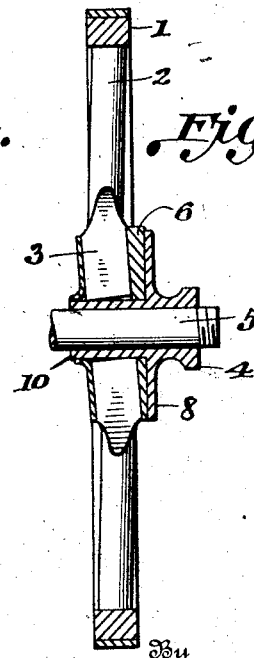 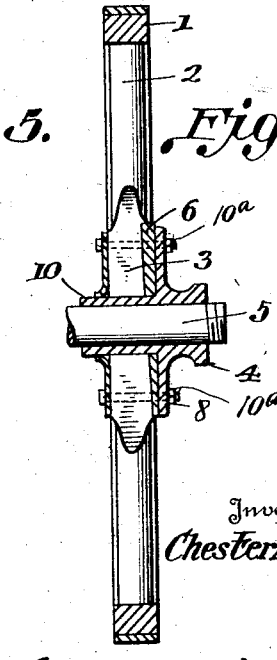
Inventor
Chester A. Hite
By
Attorney Patented Mar. 31, 1925.

1,531,338

UNITED STATES PATENT OFFICE.

CHESTER A. HITE, OF ENID, OKLAHOMA.

DEVICE FOR TAKING UP WARP IN WHEELS.

Application filed July 5, 1922. Serial No. 572,814.

*To all whom it may concern:*

Be it known that I, CHESTER A. HITE, a citizen of the United States, residing at Enid, in the county of Garfield and State of Oklahoma, have invented certain new and useful Improvements in Devices for Taking Up Warp in Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to automobile and other types of wheels. It has for its object to take up or compensate for the wobble that frequently exists in many wheels and to cause the wheel to run true. It often happens that wheels, especially wooden wheels, become so warped that in running a wobbling movement occurs that not only detracts from the appearance of the wheel but also causes or transmits to the vehicle a vibration and side lash that impairs the mileage obtainable from a vehicle whose wheels run true and materially increases wear and tear on the wheel tire. The purpose of the present invention is to overcome or remove the objectionable features mentioned by simple and efficient means. To the accomplishment of the foregoing and such other objects as may hereinafter appear the invention consists in the features hereinafter particularly described and then sought to be clearly defined by the claims, reference being had to the accompanying drawings forming a part hereof, and in which—

Figure 3 is an end elevation showing one wheel normal and the other wheel, sprung or warped, brought to normal alignment by application of the aligning element;

Figure 4 is a vertical section through a warped wheel, showing the aligning element applied to cause the wheel to run true;

Figure 1:
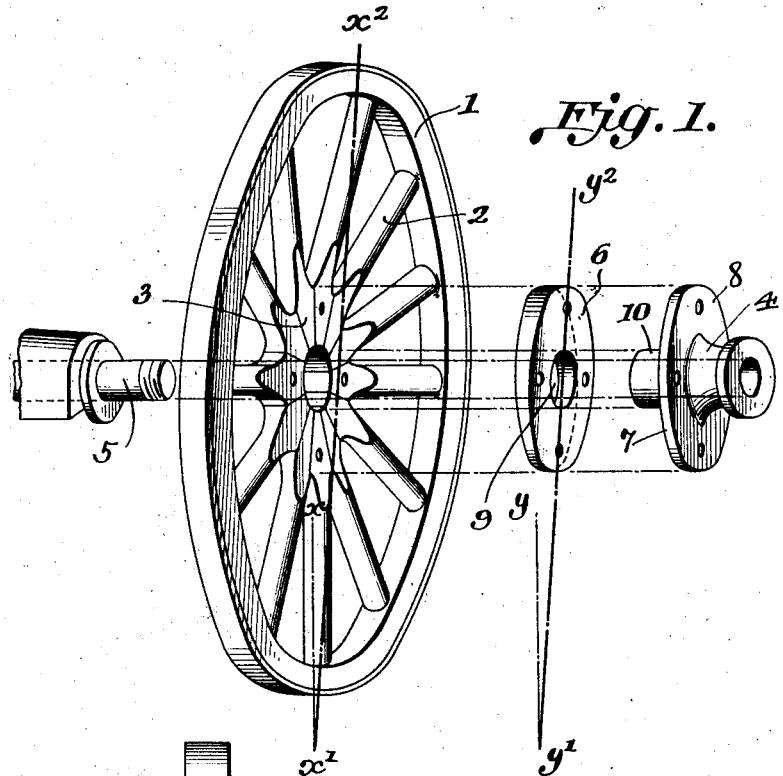
Figure 1 is a perspective view of a wooden wheel of an automobile type in which the assembled spoke tenons in one half of the wheel are warped or sprung, and in which the associated parts including the aligning element employed are shown in position for assemblage to correct the defects in the wheel.

Figure 5 a similar view of a differently warped wheel, caused to run true by the aligning element;

Figure 6 a vertical section through a wheel in which the spokes near the center of wheel or hub are dished slightly more on one side than the other, and caused to run true by the aligning element.

In the drawings the numeral 1 designates the rim or felloe of a wheel, 2 the spokes, 3 the central portion of the wheel made up of the assembled spoke-tenons 4 the hub and its sleeve, and 5 a wheel-axle.

Figure 2:
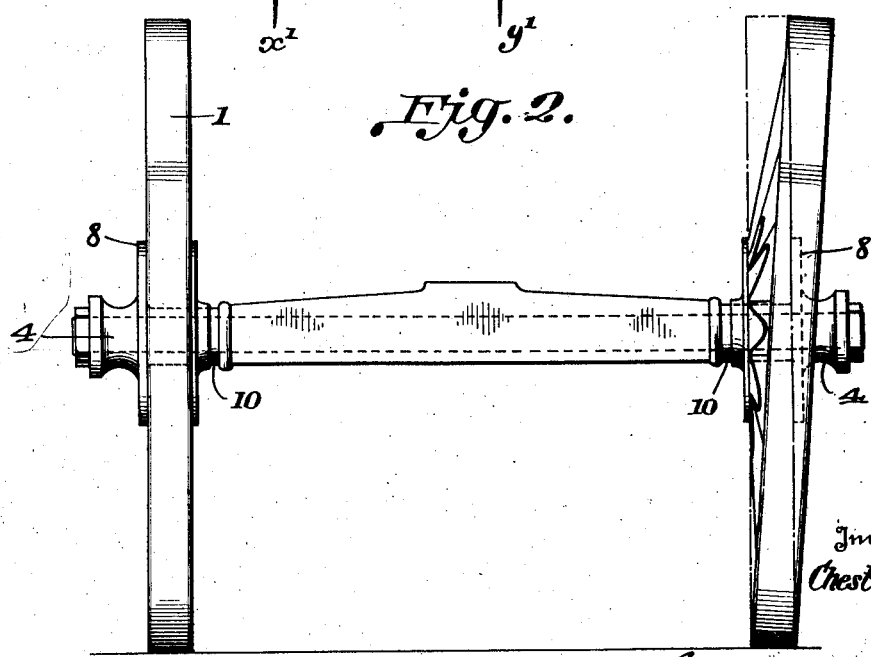
Figure 2, is an end elevation showing one wheel normal, and in full lines the other wheel sprung or warped out of alignment before insertion of the aligning element.

As illustrated in Figure 1 of the drawing a wheel is shown in which substantially the upper half indicates the spokes as sprung or warped. With such a wheel mounted without my aligning element the wheel will be out of true and have a wobbling movement such as already mentioned. To compensate for that movement and cause the wheel to run true I provide an aligning element 6, which may be in the form of a washer, one face of which is perpendicular and conforming to the perpendicular face 7 of the outer hub flange 8 and the other face made to conform to the warped assembled spoke-tenon portion 3 of the wheel, and which as shown tapers diametrically, or substantially so, so that the thicker portion of the element lies against the deepest part of the depression in the assembled spoke-tenons and the other or thinner portion will fit to the shallower portion of the depression with the inner hub flange standing as shown in Fig. 2. Thus the wheel will be trued as illustrated in Figure 3 of the drawing and will run without the objectionable wobbling mentioned. The aligning element is formed with an opening 9 to receive the sleeve 10 of the hub and will be secured to the hub by threaded bolts 10ª, as shown in Fig. 6 passed through the hub flange and the aligning member and the assembled spoke-tenons portion of the wheel, holes being made in the parts for the purpose as indicated in Figure 1 of the drawing.

In Figures 4, 5 and 6 of the drawings are illustrated wheels in each of which the wheel is sprung or warped in a different direction from the others, but in all of them the wheel brought into true by use of the particular aligning element shown in each, as in each case the tapered face of the aligning element is made to conform to the warp of the particular wheel to which applied. The taper or surface line of the take-up face of the aligning member next to the warp surface of the wheel is made to conform substantially to the warp surface and is determined or ascertained by taking proper measurements of the extent and character of the warp in the best manner that may occur to the mechanic skilled in his calling, and then the take-up face of the aligning member is made to conform to the conditions found to exist in the particular wheel which is to have its imperfection corrected. As one method of ascertaining the extent and character of the warp and the shape that shall be given to the aligning member to true-up the wheel the following may be adopted. First ascertain the radius of wheel to point where maximum wobble occurs; double this and mark it on one member of a two member or arm scale hinged together at one end. Next ascertain the extent of wobble by turning the wheel and taking measurement at point opposite and equal distance from center as original radius measurements. Now move the second member of scale apart from the other member the distance equal to the wobble at the point double the radius, or first measurement. Next ascertain the hub flange diameter and mark this on the stationary scale arm, always starting from the hinged point of the scale. At this last point on the scale measure the distance between the two arms. This distance represents the difference in the thickness of the aligning element at its thinnest and thickest points, opposite the periphery of the hub-flange, said element having one perpendicular face and an oppositely disposed inclined or tapered face. The aligned element formed as described will serve in most cases to take up the wobble and cause the wheel to run true. In exceptional cases the differences to be met will have to be arrived at by rasping or otherwise cutting the take-up face of the aligning element to change the high point or to reduce another point as will occur to the skilled mechanic. Whatever method be adopted for formation of the aligning element, the result in principle will be the same. The aligning element is preferably formed of Babbitt metal but may be formed of other material, and may be turned in a lathe having an adjustable face plate adjusted to give proper thickness to the aligning element, or may be otherwise manipulated as will best suit the convenience of the mechanic, such means not constituting the invention. Any other method than that given merely as one illustration may be employed for ascertaining the proportions and configuration to be given to the aligning element for removing the wobble and causing the wheel to run true.

Having described my invention and set forth its merits what I claim is:

1. A device for taking up warp in wheels, consisting of an aligning element adapted to be positioned between the assembled spoke tenons of the wheel and adjacent portion of a hub, having a face perpendicular to the axis of the hub and having one face shaped to conform to the warp of the wheel and the other face conform to the perpendicular face of the adjacent wheel hub portion.

2. A device for taking up warp in wheels, consisting of an aligning element adapted to be positioned between the assembled spoke-tenons of the wheel and adjacent portion of a hub, having a face perpendicular to the axis of the hub and having one face next to the assembled spoke tenons tapered conformably to the warp in the wheel and the other face conformed to the perpendicular face of the adjacent wheel hub portion.

3. A device for taking up warp in wheels, consisting of an aligning element formed with an opening for centering the element on a support and having one face shaped to conform to the warp of a wheel and designed to bear against assembled spoke-tenons of the wheel and the other face shaped to conform to the perpendicular face of the adjacent wheel hub portion, and means for securing the element in place between the spoke-tenons and hub.

In testimony whereof I affix my signature in presence of two witnesses.

CHESTER A. HITE.

Witnesses:
ESTHER BLAKELEY.
I. A. BEALL.